United States Patent [19]

Sugimura

[11] Patent Number: 5,987,403
[45] Date of Patent: Nov. 16, 1999

[54] DOCUMENT CONVERSION APPARATUS FOR CARRYING OUT A NATURAL CONVERSION

[76] Inventor: Ryoichi Sugimura, 5-17, Kanokodai-Kitamachi, Kita-ku, Kobe-shi, Hyogo-ken, 65115, Japan

[21] Appl. No.: 08/864,757

[22] Filed: May 29, 1997

[30] Foreign Application Priority Data

May 29, 1996 [JP] Japan .................................. 8-134619

[51] Int. Cl.⁶ .............................. G06F 17/28; G06F 12/00
[52] U.S. Cl. ................................................ 704/2; 707/513
[58] Field of Search ........................... 704/2–7; 707/500, 707/513, 536

[56] References Cited

U.S. PATENT DOCUMENTS

| 4,599,612 | 7/1986 | Kaji et al. | 704/3 |
|---|---|---|---|
| 4,964,030 | 10/1990 | Suzuki et al. | 704/6 |
| 5,005,127 | 4/1991 | Kugimiya et al. | 704/5 |
| 5,276,793 | 1/1994 | Borgendale et al. | 707/513 |
| 5,349,368 | 9/1994 | Takeda et al. | 704/3 |
| 5,361,205 | 11/1994 | Nishino et al. | 704/2 |
| 5,373,442 | 12/1994 | Kutsumi et al. | 704/4 |
| 5,548,508 | 8/1996 | Nagami | 704/2 |
| 5,587,902 | 12/1996 | Kugimiya | 704/2 |
| 5,608,622 | 3/1997 | Church | 704/5 |
| 5,678,051 | 10/1997 | Aoyama | 704/1 |
| 5,758,361 | 5/1998 | Van Hoff | 707/513 |

FOREIGN PATENT DOCUMENTS 9718516 of 0000 WIPO .............................. G06F 17/28

OTHER PUBLICATIONS

"Hypermedia Translation Tool," IBM Technical Disclosure Bulletin, vol. 34, No. 10B, Mar. 1992, pp. 198–199.

*Primary Examiner*—David R. Hudspeth
*Assistant Examiner*—Patrick N. Edouard
*Attorney, Agent, or Firm*—Price Gess & Ubell

[57] ABSTRACT

A method and document conversion apparatus for converting text of one language or dialect into text of another language or dialect without losing the tag symbols included in the text. The system includes a unit for storing the source text, a unit for storing data which shows the display properties of the source text and the location to which the properties are attached, a unit for converting the text body of the source language into the text body of the target language, a unit for storing the converted text body, a unit for storing information which shows the relations between words in the target text and words in the source text, a unit which processes the target text body and prepares data which shows the display properties of the target text and the location to which the properties are attached, a unit for preparing the target text by attaching tag symbols to the target text, and a display unit for displaying the text.

33 Claims, 14 Drawing Sheets

Fig. 2

$\overbrace{\phantom{xx}}^{a1}$ $\overbrace{\phantom{xx}}^{a2}$ $\overbrace{\phantom{xx}}^{a1}$ $\overbrace{\phantom{xx}}^{a2}$ I ⟨B⟩ h ⟨/B⟩ ave a ⟨B⟩ pen ⟨/B⟩ .

Fig. 3 (A)

I have a pen. ← 110
0 1 2 3 4 5 6 7 8 9 10 11

| Source Language | 0−0 | 2−5 | 9−11 |
|---|---|---|---|
| Target Language | 0−1 | 5−10 | 2−3 |

Fig. 4

(A) Document Data      I ⟨B⟩ h ⟨/B⟩ ave   a   ⟨B⟩ pen ⟨/B⟩ .

(B) Number of Characters from Beginning    0 1    2      3 4 5   6 7 8     9 10 11

(C) Source Display Data        (2−2, Bold)       (9−11, Bold)

Fig. 5

(A) Target Display Data     (2−3, Bold)    (5−5, Bold)

(B) Displayed Target Language    私はペンを持っています。

Fig. 6

L1 →   I have a pen.

| String Number | Displayed Character String of Source Language | Source Display Data | Conversion Data | Displayed Text in Target Language | Target Display Data |
|---|---|---|---|---|---|
| 1 | I have a pen. | (9-11,Bold) |  | 私はペンを持っている | (2-3,Bold) |
| 2 | I have a pen. | (7-7,Bold:Pointer) | (0,0-1), (9-11,2-3) | 私はペンを持っているP | (10-11,Bold:Pointer) |
| 3 | I _have_ a pen. | (2-3,UL),(4-5,Bold) | (2-5,5-9) | 私はペンを持っている | (5-6,UL),(7-8,Bold) |
| 4 | I have a <u>P</u>E<i>N</i>. | (9,UL),(10,Bold) (11,Italic:Pointer) |  | 私はペンPを持っている | (2,UL),(3,Bold) (4,Italic:Pointer) |
| 5 | I never run. | (2-6,UL) | (0,0-1), (2-6,2-4), (2-6,7-8) | 私は決して走らない | (7-8,UL) |
| 6 | That's it! | (0-9,UL) | (0-9,0-3) | そこまで | (0-3,Cubic) |

Fig. 17
Pattern 1 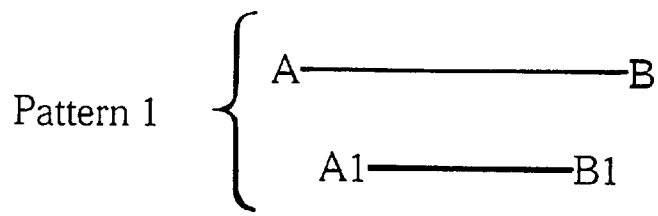
Pattern 2 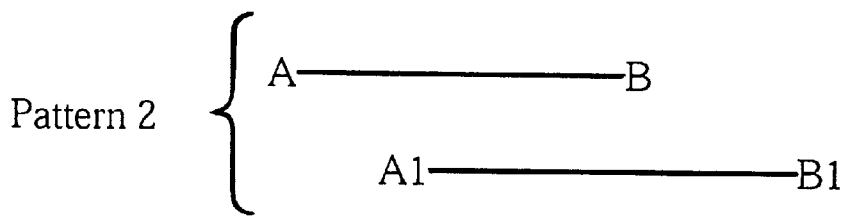
Pattern 3 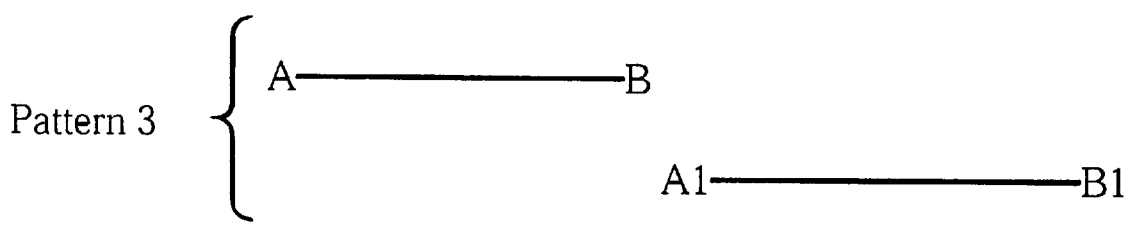
Pattern 4 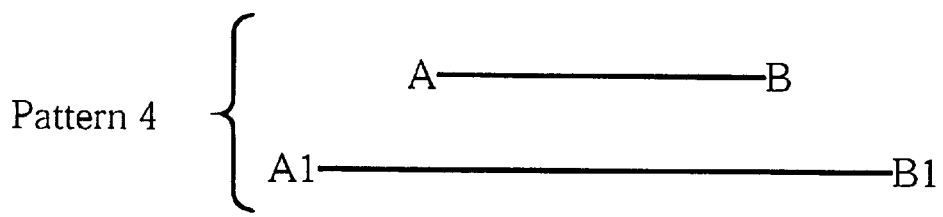

DOCUMENT CONVERSION APPARATUS FOR CARRYING OUT A NATURAL CONVERSION

BACKGROUND OF THE INVENTION

(1) Field of the Invention

This invention pertains to a data processing apparatus which translates text data written in one language into another language or converts text data written in one dialect into text of another dialect in the same language, or, more precisely, pertains to an apparatus which conducts translation/conversion while maintaining the display properties attached to the text data before translation/conversion.

(2) Related Art

It is becoming more and more common these days to send and receive text data to and from abroad via international communication networks like the Internet. Text data is normally made up of tag symbols and the text body without tag symbols. Tag symbols are composed of start tags and end tags. Start tags are formed by entering the tag name between a "<" and a ">", while end tags have a "/" before the tag name. For example, HTML uses B for bold, I for italic, and U for underline. Also, in text data received from the Internet, anchor tags can be used as start tags to show a pointer to another file. Anchor tags are written in the format <A HREF="link destination text">.

When text data is received from abroad through the Internet, the text body written in a foreign language must be translated into one's native language. Machine translation software is used for this.

Japanese Laid-open Patent Application #6-44296 is a well-known conventional machine translation apparatus. This conventional apparatus is made of a separation unit which separates the text data received from the Internet into the text body and the tag symbols, a memory unit which stores the tag symbol and associates the symbol with its accompanying word, a dictionary lookup/morphological analysis unit which conducts dictionary lookups and morphological analyses on the text body, a syntactic analysis unit which conducts syntactic analyses on the text body after morphological analysis, a conversion unit which converts the result of syntactic analysis and generates a parsing tree of the target language, and a translation text generation unit which refers to the contents of the memory unit in order to generate a translated text in the target language based on the parsing tree of the target language, with tags inserted.

However, there is a drawback with the conventional machine translation apparatus. The apparatus attaches tag symbols to the target language word Corresponding to the word with tag symbols in the source language. As long as the display properties of the source language are the same as those of the target language, there is no incongruity. But often there are times when the tag symbol is attached to only some of the letters in a word. When this happens the display properties attached to text data in the source language are ignored in the text date of the target language, and therefore fails to be displayed. For example, when the text data of the source language is "I<B>h</B>ave a pen.", the tag symbols in text data of the target language are dropped, so that the text body becomes without the tag symbols. This results in an unnatural translation.

Also, text data received from the Internet contains pointers as anchor tags which display links to other files. If the anchor tag is attached to only some of the letters in the word, then the tag symbols are dropped in the document data of the translation, so one cannot move to the link destination file using the translated text.

Although the above problem appears when translating from one language to another, a similar problem may appear when converting one dialect into another dialect of the same language.

SUMMARY OF THE INVENTION

It is therefore a primary object of this invention to present a character string conversion apparatus which can display the part which corresponds to the second character string without dropping the part of the character string with display properties, even when the display properties are attached to only a portion of the character string.

The above object can be achieved by a document conversion apparatus for converting source data into target data which includes a source text memory unit for storing a source text; a source display data memory unit for storing a source display data, wherein the source display data is a combination of source display properties included in the source text and a location in which source display properties are attached to the source text; a conversion unit for converting a source text body into a target text body, the source text body being text in which source display properties are excluded, the target text also being text in which display properties are excluded; a target text memory unit for storing the converted target text body; conversion paired information memory unit for storing conversion paired information, wherein the conversion paired information is a combination showing how the words in the source text correspond to the words in target text, wherein word is defined as a unit with meaning; a process unit for processing the target text body and preparing a target display data by searching the source display data and the conversion paired information, wherein the target display data is data showing target display properties to be attached and a location in the target text body to which should be attached target display properties corresponding to the source display properties; a target text preparation unit for preparing a target text by attaching the display properties to the target text body stored in the target text memory unit, the attaching carried out by conforming to the contents of the target display data obtained from the process unit; and a display unit for displaying the prepared target text.

Here, the source display properties and target display properties may include character decoration and pointers to link destination files.

Or, the source text and the target text may both be HTML documents, and the contents and the area of the source and target display properties may be indicated by tag symbols.

Furthermore, the process unit may include a display property attachment area search unit for checking the location of the source display properties and the word shown by the information of the source text of the conversion paired information, and searching in one-letter units to see whether the display properties are attached to any of the letters inside the source text; a distinction unit for distinguishing whether source display properties are attached to a part of the word, or display properties are attached to the entire word according to the search result; and a main preparation processing unit for checking the information of the target text in the conversion paired information, and using the distinction result to process the target text body and prepare the target display data.

Furthermore, the main preparation processing unit may include a conversion word presence detection unit for searching the conversion paired information to see whether the word corresponding to the word in the source text is present in the target text; a first preparation processing unit for carrying out the process of inserting special symbols to the target text body stored in the target text memory unit while preparing the target display data for the special symbols when the conversion word presence detection unit determines that there is no corresponding word in the target text; and a second preparation processing unit for preparing the target display data for the letter within the word when the conversion word presence detection unit determines that there is a corresponding word in the target text.

Furthermore, the special symbol attachment process carried out by the first preparation processing unit may be a process which uses letters which do not belong to a target language as special symbols to be inserted in the start or end locations of the target text body.

Furthermore, the second preparation process unit may include a first processing unit for operating when the distinction unit determines that the display properties are attached to the entire word; and a second processing unit for operating when the distinction unit determines that the display properties are attached to a part of the word.

Furthermore, the first processing unit may detect the word in the target text which corresponds to the word in the source text based on the conversion paired information, and may prepare the target display data which contains target display properties of the entire word, and wherein the second preparation processing unit prepares the target display data which contains target display properties of a part of the corresponding word in the target text.

Furthermore, the second preparation processing unit may include a letter number detection element for detecting the number of letters from the start of the word in the source text to the letter with display properties attached; and a process element for preparing the target display data which contains the display properties from the start of the corresponding word in the target text to the location away from the same number of letters as the number of letters previously detected.

Furthermore, the process element may include a comparison element for comparing the number of letters of the word in the target text to the detected number of letters of the letter number detection element; a first element for operating when, as a result of comparison, the number of letters in the word of the target text is the same or greater than the number of detected letters; and a second element for operating when the number of letters in the word of the target text is less than the number of detected letters.

Furthermore, the first element prepares the target display data which includes display properties attached to letters in the word of the target text, the letters excluding a detected number of letters starting from the first letter of the word.

Futhermore, the second element may carry out the process of inserting a special symbol after the corresponding word in the target text which is stored in the target text memory means, and may prepare the target display data for the special symbol.

And, the process unit may include a conversion paired information overlap search unit for searching to see if there are more than two sets of conversion par information for the same word in the source text; a selection unit for selecting the target display data prepared by using one set of the conversion paired information when there are more than two sets; and a target text preparation unit for carrying out text preparation using the target display data selected by the selection unit.

Furthermore, the target display data to be selected by the selection unit may be for the word in the target text closer to the sentence start, or for the word closer to the sentence end.

Furthermore, the above object can also be achieved by a document conversion apparatus including a source text acquisition unit for acquiring and storing source text written in HTML from outside; a source display data preparation unit for preparing and storing the source display data by reading the source text, finding the contents of the display properties and the locations to which the display properties are attached by searching the tag marks attached to the source text, wherein the source display data is a pair made up of data showing the contents of the display properties and the location to which display properties are attached; a conversion unit for converting a source text body into a target text body, the source text body being text in which source display properties are excluded, the target text also being text in which display properties are excluded; a target text memory unit for storing the converted target text body; a conversion paired information memory unit for storing conversion paired information, wherein the conversion paired information is a combination showing how the words in the source text correspond to the words in target text, wherein word is defined as a unit with meaning; a process unit for processing the target text body and preparing a target display data by searching the source display data and the conversion paired information, wherein the target display data is data showing target display properties to be attached and a location in the target text body to which should be attached target display properties corresponding to the source display properties; a target text preparation unit for preparing the text through inserting tag symbols into the target text stored in the target text memory unit by conforming to the target display data; and a display unit for displaying the prepared target text.

BRIEF DESCRIPTION OF THE DRAWINGS

These and other objects, advantages, and features of the invention will become apparent from the following description thereof taken in conjunction with the accompanying drawings which illustrate a specific embodiment of the invention.

In the drawings:

FIG. 2 is a diagram showing an example of source data.

FIG. 3 is a diagram which shows the source text body, the target text body, and the pertaining conversion paired information.

FIG. 4 is a diagram which shows the order for preparing the source display data, and the prepared source display data.

FIG. 5 is a diagram which shows the target display data and an actual display of the target text.

FIG. 6 is a diagram which shows an example of displayed source text and target text.

FIG. 7 is a diagram showing target text corresponding to a plurality of source text, and source and target conversion paired information in table format.

FIG. 17 is a diagram which shows overlapping patterns between the word and the area with display properties attached.

PREFERRED EMBODIMENT

Figure 1:
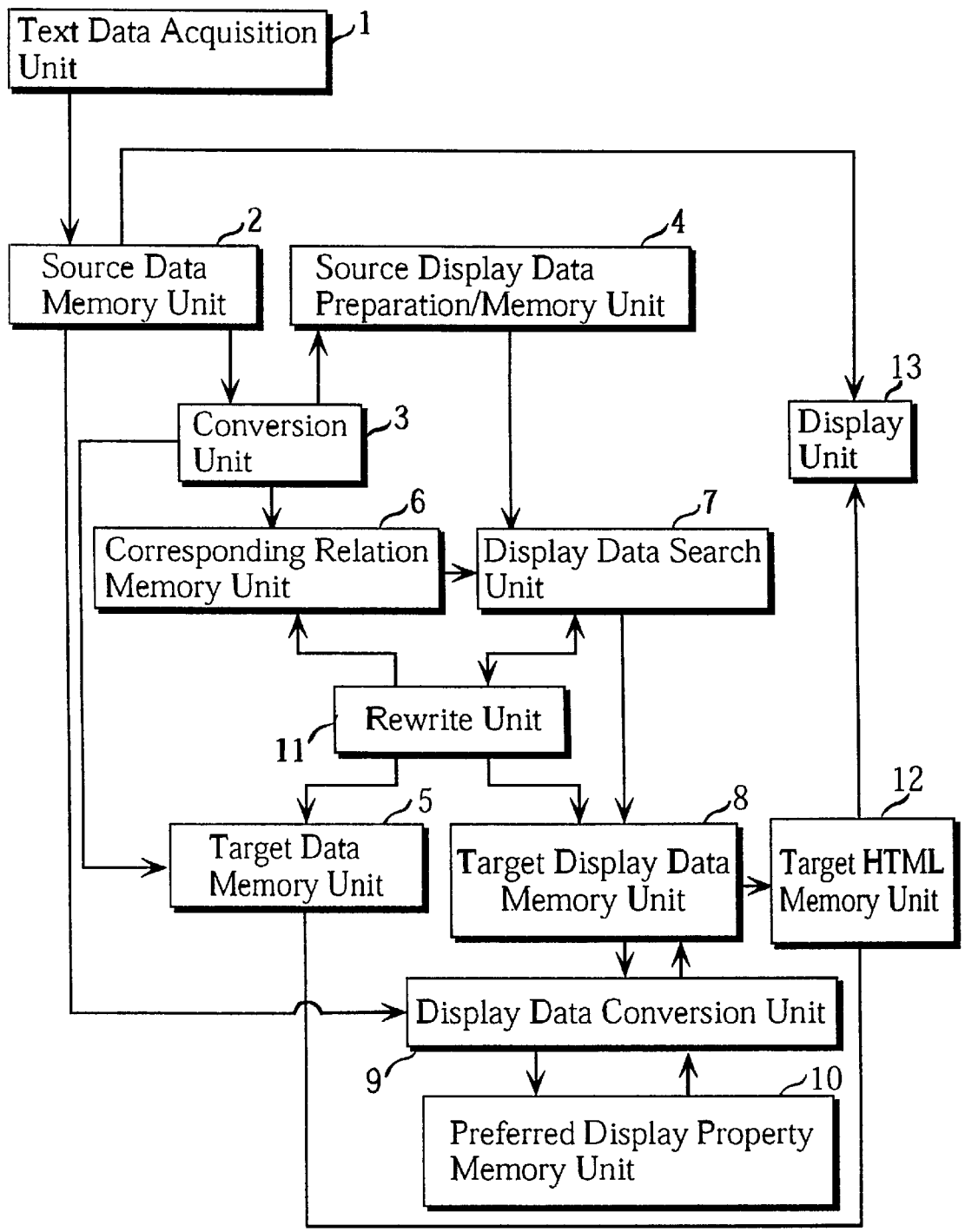
FIG. 1 is a block diagram of the document conversion apparatus as an embodiment of the invention.

FIG. 1 shows a character string conversion apparatus as an example of this invention. In the drawing, 1 is the text data acquisition unit which obtains text data from the Internet, for example. An example of text data is shown in FIG. 2. As Shown in this figure, the text data is made of the text body Which does not contain the set of tag symbols a1a2 and a1a2. As previously stated, tag symbols are made up of start tag symbols and end tag symbols. The text data acquired by the text data acquisition unit is stored in source data memory 2.

Conversion unit 3 contains the entire configuration of the conventional machine translation apparatus excluding the tag symbol memory. Namely, conversion unit 3 contains a separation unit which separates the text data of the source language into the text body and tag symbols, a dictionary search/morpheme analysis unit, a syntactic analysis unit, and a translation text generation unit which refers to the contents of the memory unit and the conversion unit to generate a translated text body in the target language based on the parsing tree of the target language.

FIG. 3(A) shows the text body of the source language separated from the tag symbols. FIG. 3(B) shows the text body in the target language. The numbers underneath both text bodies show the order of each letter from the start of the text body. A space between two words is counted as one letter, while the first letter of text is numbered 0. FIG. 3(C) is a figure expressing the corresponding words of the source and target languages in pairs of numbers from the start of the text body. The paired information of FIG. 3(C) is called conversion paired information.

The tag symbols separated from the text data in conversion unit 3 are sent to the source display data preparation memory unit 4, and the text body converted by the conversion unit 3 is stored in target data memory unit 5. Conversion paired information is stored in corresponding relation memory unit 6.

Source display data preparation memory unit 4 receives tag symbol from conversion unit 3 and checks the text data stored in source data memory unit 2, prepares and stores a pair of the number of letters from the start of the text data to the word surrounded by tag symbols, and the tag's name. Pair information prepared this way is referred to as source display data. FIG. 4(C) shows the source display data prepared with reference to document data of FIG. 4(A).

Display data search unit 7 uses the source display data which is prepared in source display data preparation memory unit 4, searches the conversion paired information stored in the corresponding relation memory unit 6, processes the text body of the target language while calculating the location to which the corresponding tag symbol in the text body should be attached. The information composed of tag name and location is called target display data.

In the example in FIG. 4, source display data is the two (2-2, Bold) and the (9-11, Bold). For the information of (9-11, Bold) the corresponding target display data is immediately found as (2-3 Bold) because the letter location of the target language corresponding to the letter location 9-11 of the source language is obvious from the conversion paired information of FIG. 2(C). However, for the source display data (2-2, Bold), there is nothing that corresponds with the (2-2) in the source language of the conversion paired information of FIG. 2(C), so it is found by the following computation. Thus, conversion paired information which contains letter location (2-2) on the source language side is searched, and the overlapping number $\alpha$ of letters of both the conversion paired information and the source display data, and the overlapping letters' start location $\beta$ from the beginning of the word is found. In this case, the source language side which contains (2-2) is (2-5), $\alpha$ equals 1, and $\beta$ equals 0 from the first letter in the corresponding word shown in the conversion paired information. $\beta$ is calculated by the number of letters from the first letter of the conversion paired information. Then, the target language of the Conversion paired information which corresponds to (2-5) is (5-10), and within the word the letters in the area from $\beta$ to $\alpha+\beta$, thus the area from the fifth letter of the target language are judged to be the letters to which the display properties of the target language should be attached. Here $\alpha$ equals 1 and $\beta$ equals 0, so ultimately the location to which the display properties of the target language should be attached is (5-5). Thus, the target display data corresponding to the source display data of (2-2, Bold) is set as (5-5, Bold). FIG. 5(A) shows the target display data set in the above manner. FIG. 5(B) shows an example of the text body of the target language displayed conforming to this display data. The characters indicated by target display data are displayed in bold, and one can see that they correspond naturally with the document data or the source language shown in FIG. 2. More detailed processing operations of the display data search unit 7 are shown in FIGS. 8~16, and will be discussed later.

The target display data which the display data search unit 7 searches and sets is temporarily stored in the target display data memory unit 5. However, this target display data is sometimes rewritten by the functions of the display information conversion unit 9.

The display information conversion unit 9 is connected to the preferred display property memory unit 10. The information for attaching certain display properties which differ from the display properties of the source language side are written in the preferred display property memory unit 10. These include cases where the text data is a certain sentence pattern such as a command or exclamation, the translation is from a certain source language to a certain target language, or the source language side has certain display properties attached. For example, instead of transcribing the English character string "That's it!" into the Japanese by leaving the display properties as is, it would be easier to draw the average Japanese person's attention by enlarging the characters, thus achieving a more meaningful translation. Preferred display property memory unit 10 stores this kind of information to direct a change in the display properties of this kind of sentence in the source language.

When target display data which was prepared in display data search unit 7 is loaded into target display data memory unit 8, display information conversion unit 9 checks the text data stored in source data memory unit 2 and performs a search inside preferred display property memory unit 10 looking for hit information. If there is corresponding information, then it rewrites the display properties based on that, and if there is no corresponding information, then it does not rewrite.

Rewrite unit 11 is the part which carries out the insertion of special symbols, a function of display data search unit 7, and rewrites the conversion paired information and target display data by shifting the letters after the location of insertion by one place. For example, P seen in the target language line 2 and line (hereafter "string") 4 in FIG. 7 corresponds to a special symbol. The insertion of special symbol P is performed on the text body in target data memory unit 5. In this case, if the special symbol is inserted between two words in the middle of the text body as shown in string #4 of FIG. 7, the locations of each letter after the insertion location are shifted one place from before the symbol was inserted. And, because of this shift in letter location, it becomes necessary to rewrite the conversion paired information and the target display data. Rewrite unit 11 performs such rewriting of corresponding paired information on corresponding relation memory unit 6 and target display data memory unit 8.

Target HTML preparation unit 12 prepares an HTML document using the final text body stored in target memory unit 5, and the target display data stored in target display data memory unit θ.

Display unit 13 displays the source text (HTML document) stored in source data memory unit 2 and the target text (HTML document) prepared by the target HTML preparation unit 12 according to the contents of the display properties. FIG. 6 shows an example displayed in display unit 13. L1 is the source language, while L2 is the target language.

Next, the control operations of display data search unit 7 and rewrite unit 11 are explained using the flowcharts of FIGS. 8~16 while referring to the examples in FIG. 7.

Figure 8:
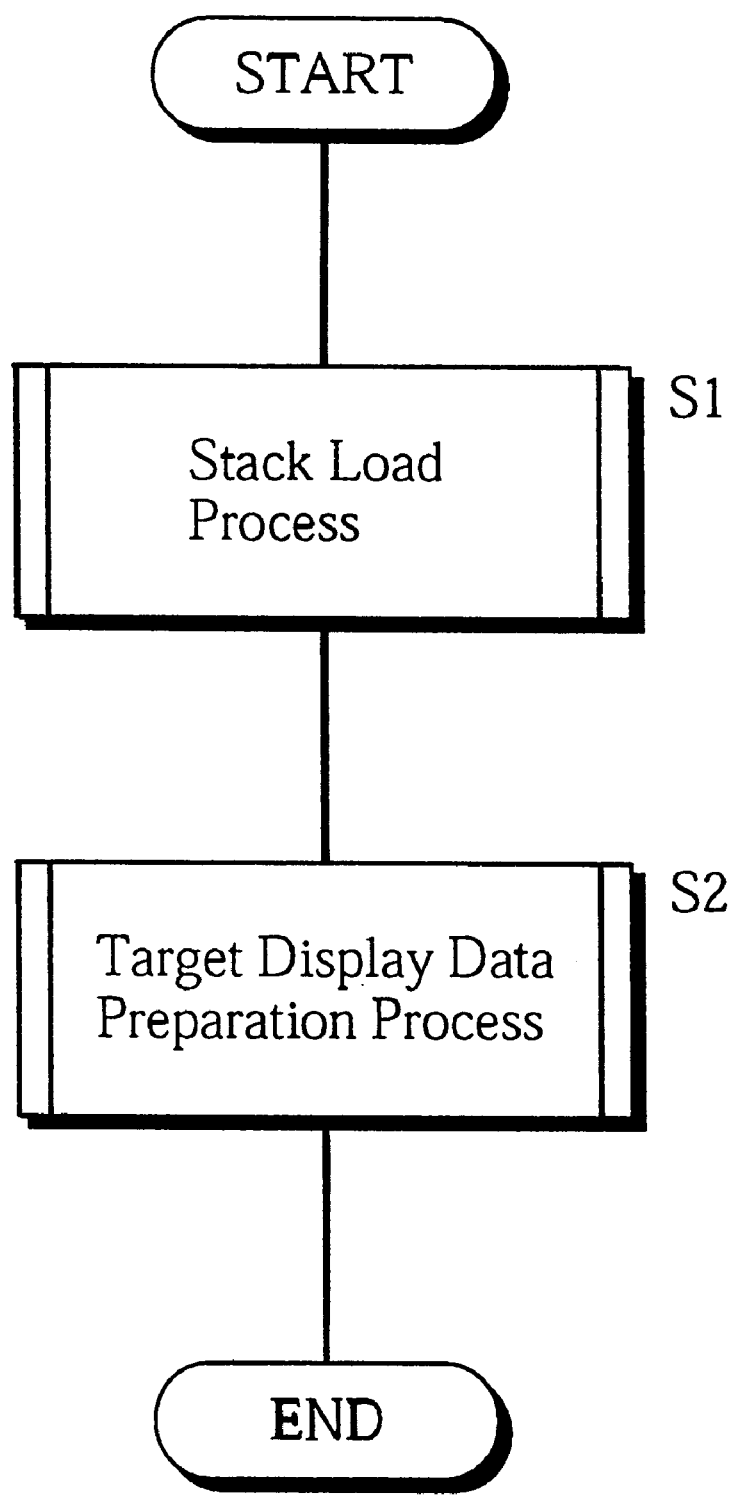
FIG. 8 is the main flowchart showing the processes of the display data search unit and the rewrite unit.

FIG. 8, when the program starts in the main flowchart, the stack load process (Step 1) is performed, and then the target display data preparation process (Step 2) is performed. These steps, Step 1 and Step 2, are shown in detail in the subroutines of FIGS. 9–16.

Figure 9:
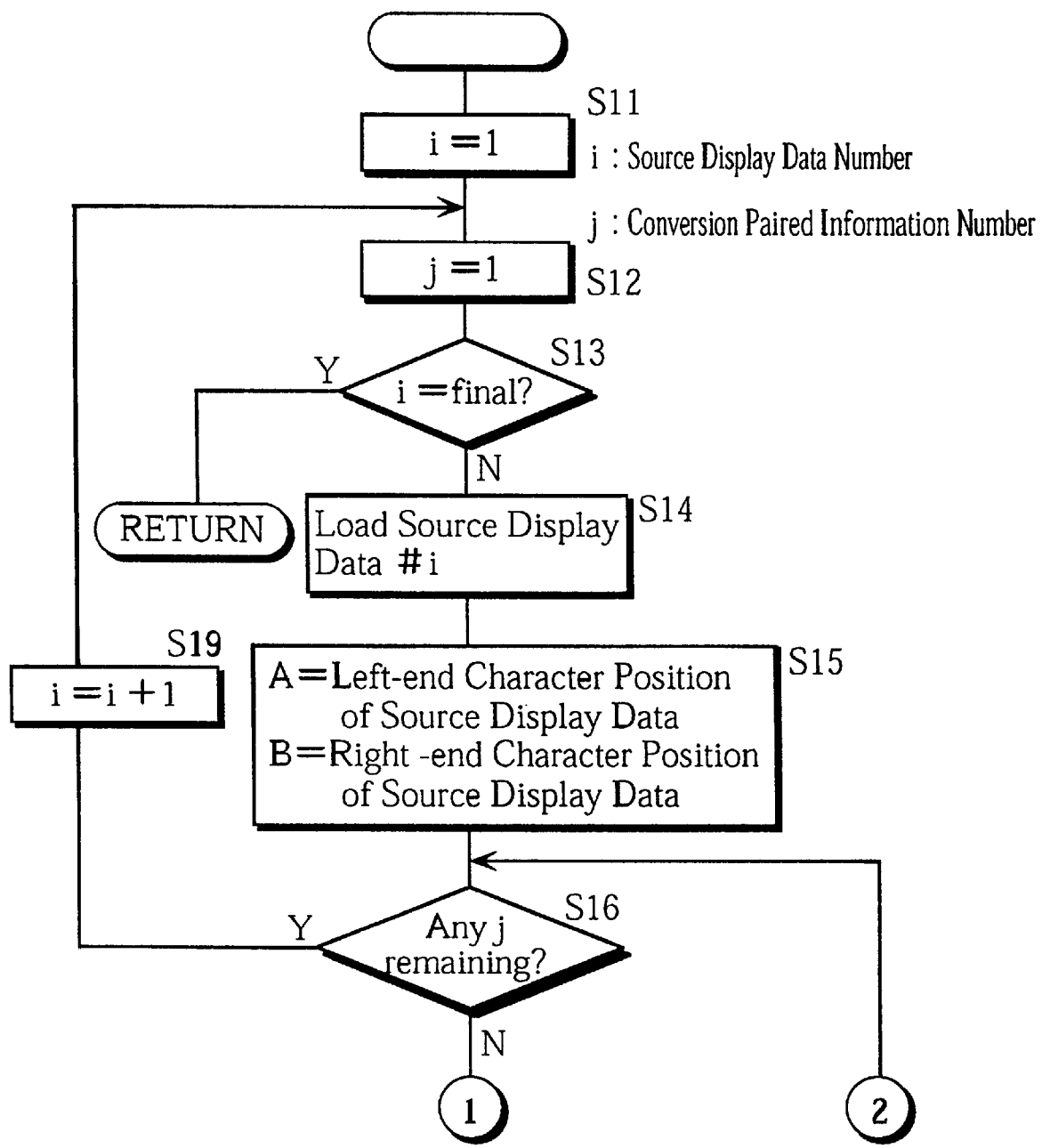
FIG. 9 is a diagram showing the front part of the flowchart showing the stack loading process.
Figure 10:
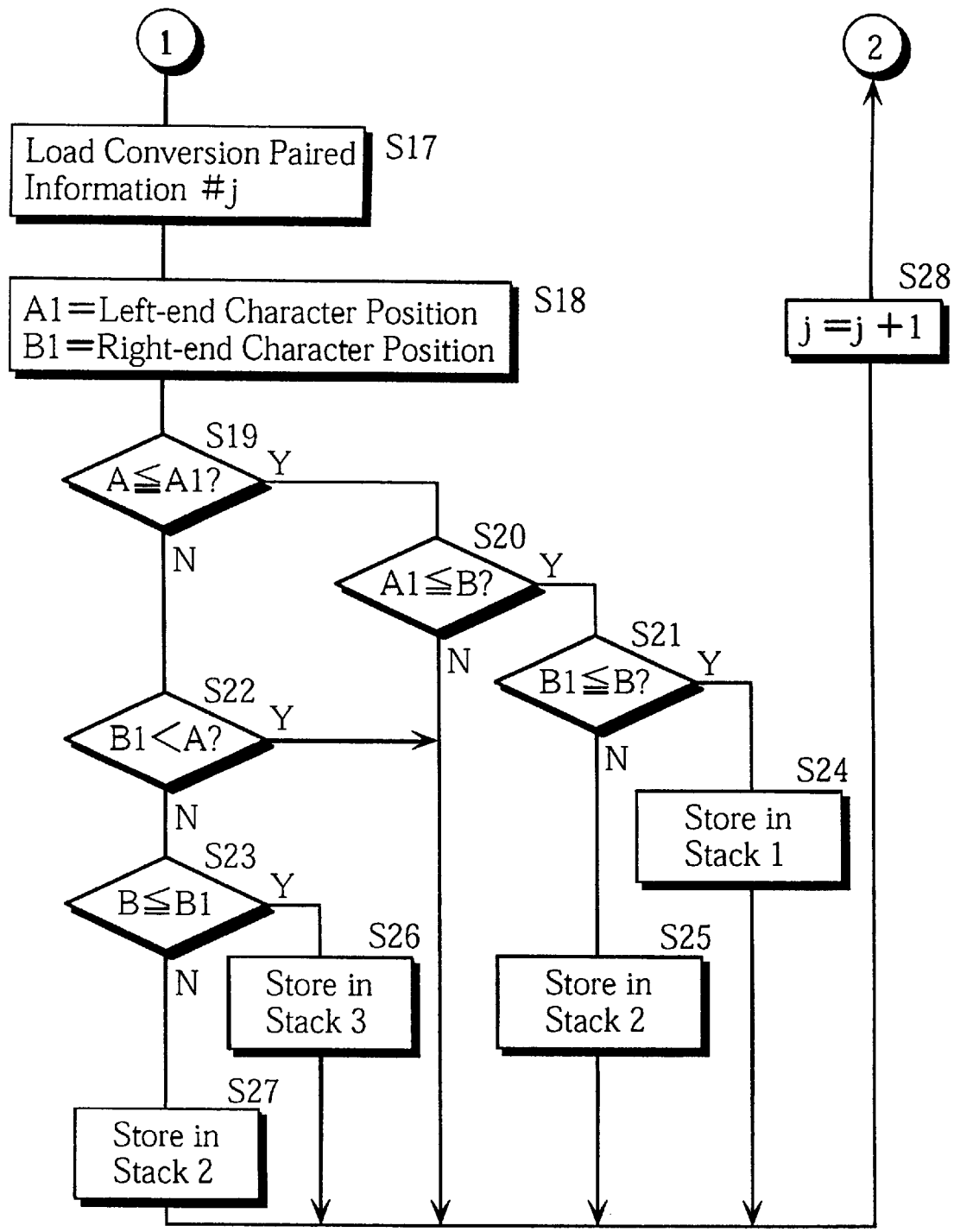
FIG. 10 is a diagram showing the back part of the flowchart showing the stack loading process.

The symbols used in the flowchart will be explained first. i is the number for the source display data. Several source display data are prepared for one text data, but in this case a small i number is assigned to the source display data which possesses a small value of the letter order from the start of the document data. j is the number for the conversion paired information. In this case of j, there is a small value assigned to the small value of the letter order of either the source language side or the target language side. A and B are registers which set the right-end and left-end letter locations of the source display data. For example, in the case of source display data (9-11, Bold) pertaining to the document data of string #1, then A is set to 9 and B is set to 11. In the same manner, A1 and B1 are registers which set the left-end and right-end letter locations of the source language of the conversion paired information. A2 and B2 are performed at the same time as the setting of A1 and B1. FIGS. 9 and 10 are subroutines of Step 1.

Display data search unit 7 is activated when the source display data is newly prepared by and stored in source display data preparation memory unit 4, and after activation is called into the subroutine in step S1 and performs the processes in FIGS. 9 and 10, First, display data search unit 7 resets i and j (Step 11, Step 12), loads the first of the source display data (Step 15), checks that information, and sets the register of the values of A and B. For example in the case of the document data of string #4 in FIG. 7, (9, UL) is loaded as the first of the source display data, and A and B are set to 9. Next the first conversion paired information is loaded from the corresponding relation memory unit 6 (Step 17), and the left-end and right-end letter locations of the source language are set in registers of A1 and B1 (Step 18). In the case of the document data of string #4 in FIG. 7, the first conversion paired information unit is (0, 0-1), so A1 and B1 are set to zero.

In the next Steps 19~23, the values of A, B are compared to the values of A1, B1. By comparing them one can judge which pattern shown in FIG. 17 corresponds to the relation of the values of A, B and A1, B1. In FIG. 17, pattern 1 shows a form in which A1, B1 are included in the letter range from space A to space B (hereafter A~B). Pattern 2 shows the form in which A~B partly match A1~B1. Pattern 3 shows the form where A~B is completely different from A1~B1, and pattern 4 shown the form in which A~B is completely included in A1~B1 (opposite form from pattern 1).

A result of "yes" in steps 19 through 21 means pattern 1. Results in "no" in step 21 and "yes" in steps 19, 22, and 23 mean pattern 2. Results of "no" in step 20 and "yes" in step mean pattern 3. And results of "yes" in step 23 mean pattern 4.

If pattern 1, 2, or 4 is detected, then the source display data of location i and the conversion paired information of location j are loaded into the corresponding first through third stack. If pattern 3 is detected, then nothing is loaded into any stack. If patterns 1, 2 or 4 are detected, then step 28 is executed after loading is finished, but if pattern 3 is detected, then step 28 is executed immediately. Then, j is increased by one increment, as the second conversion paired information is stored (step 17) and the loading operations into the stack are carried out as before (steps 18, 19 through 27). Hereafter the same processes are carried out by incrementing j one by one until j has reached the final conversion paired information Then, after the final conversion paired information processing is finished, i is incremented (step 14) while j in reset (step 12), and the second of the source display data is stored (step 29). and the second of the source display data j is incremented one by one while target display data is compared to each conversion paired information, and then it is determined which pattern corresponds. If patterns 1, 2, or 4 correspond, then the process of loading one set of the first display information and the conversion paired information into the corresponding stack is carried out. This process is applied to all of the source display data present in the text data. For example, if it were the document data of string #4 in FIG. 7 and each of the source display data were compared one by one to the conversion paired information, no information would be loaded into stacks 1 or 2, but three sets of information, namely (9, UL): (9-11, 2-3), (10, Bold),: (9-11, 2-3), (11, Italic:Pointer): (9-11, 2-3) would be loaded into stack 3.

Similarly, in the case of the document data of string #1, then only one set which is made up of (9-11, Bold): (9-11, 2-3) is loaded into stack 1. In the case of the document data of string #2, then no data is loaded into any stack. In the case of the text data in string #3, the two sets which are made up of (2-3, UL): (2-2, 5-9) and (4-5, Bold): (2-5, 5-9) are loaded. In the case of the text data in string #5, the two sets of information made up of (2-6, UL): (2-6, 2-4), and (2-6, UL): (2-6, 7-8) are loaded. Furthermore in the case of the text data of string #6, one set of information made up of (0-9, UL): (0-9, 0-3) is loaded. As explained before, however, the text data of string #6 is modified by the contents of preferred display property memory unit 10, so this data is not displayed.

Figure 11:
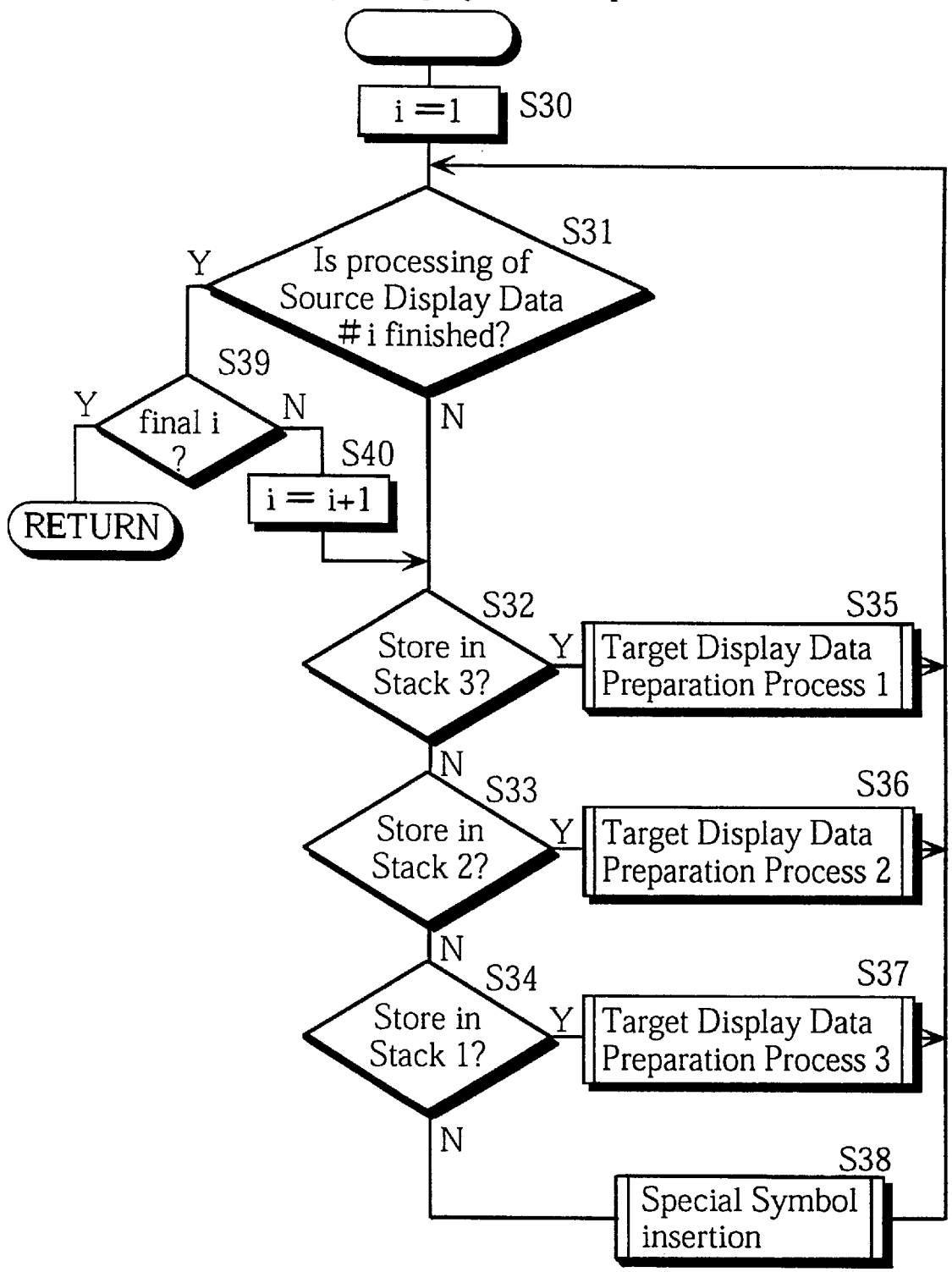
FIG. 11 is a flowchart which shows the target display data preparation process and the special symbol insertion process.

When the loading process for all of the source display data is finished (step 13), the process returns to the main flowchart. Then, proceeding to step 2, the subroutines of FIGS. 11–16 are called. FIG. 11 shows the target display data preparation process. First, in step 30, the variable i which designates the source display data is set to 1. Here, source display data designated by i is the information stored into the source display data memory unit. Then, the sets which are made up of the first of the source display data to be designated and the conversion paired information are checked to see whether they are stored in stacks 1, 2, or 3 (steps 32–34). If a set is stored in stack 2 or stack 3, target display data preparation process 1 is carried out (steps 35–36), and if another set is stored in stack 1, target display data preparation process 2 is carried out (step 37). If the source display data is not stored in the source display data preparation memory unit 4 nor in any stack, the source display data is considered to have display properties attached to a word without a Japanese translation such as an infinitive, and the special symbol insertion process is carried out.

After the above processes are carried out leaving none of the source display data (step 31), i is increased by 1 (step 40), and the same process is carried out on the source display data in the next location. When this is carried out on all of the source display data stored in source display data preparation memory unit 4, the process returns to the main flowchart.

Furthermore, the decision at step 31 of whether the processes of steps 35–39 on the source display data in location i has been completed is dependent on two things. The first is the search of whether the identifier of information corresponds to the processed memory unit which has saved the processed set identifier even if this information does not exist in any stack. The second is the search of whether or not the set of the source display data and the conversion paired information in location i has been loaded into stacks 1, 2, or 3.

Figure 12:
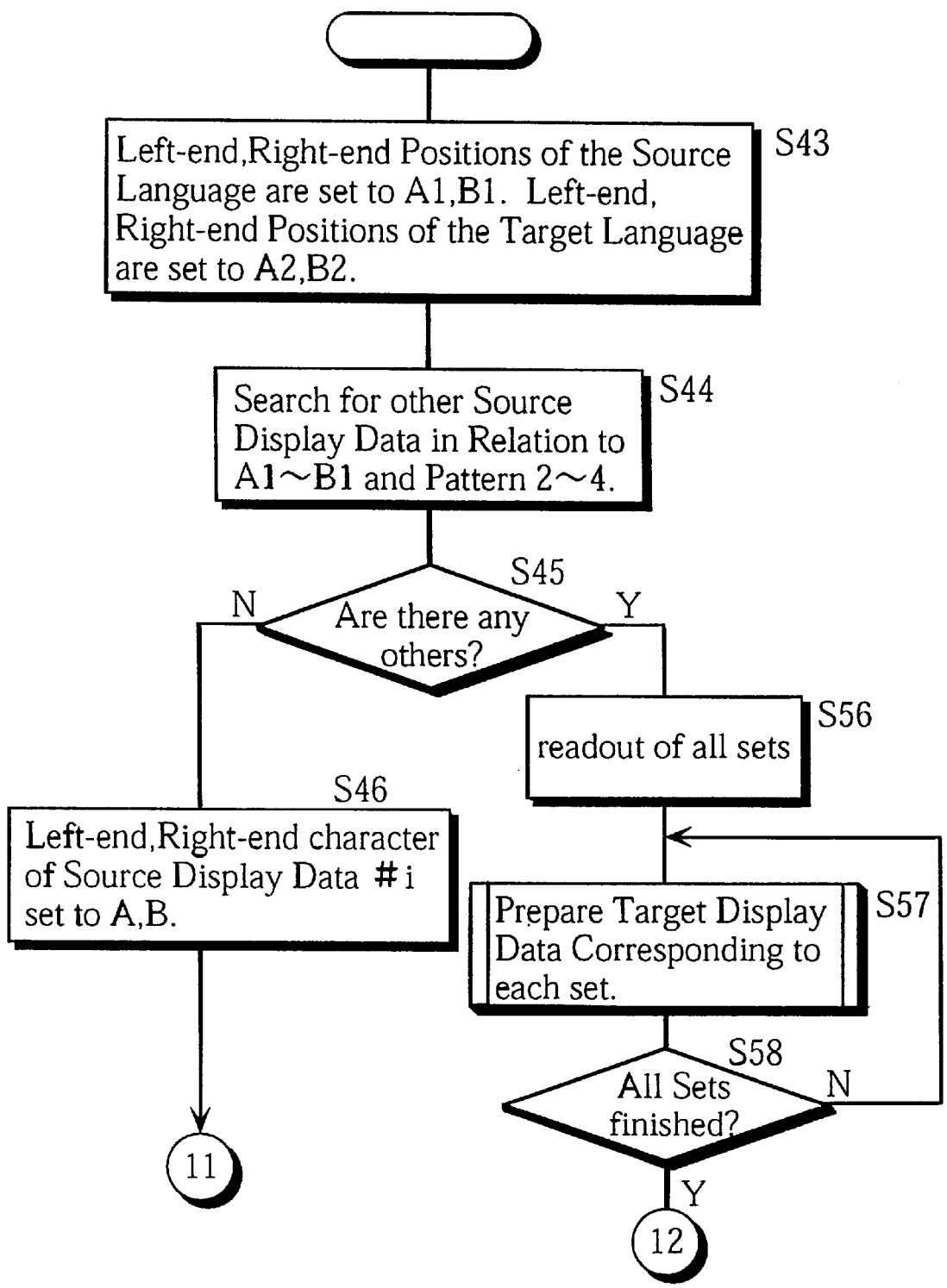
FIG. 12 is a flowchart showing target display data preparation processes 1 and 2.
Figure 13:
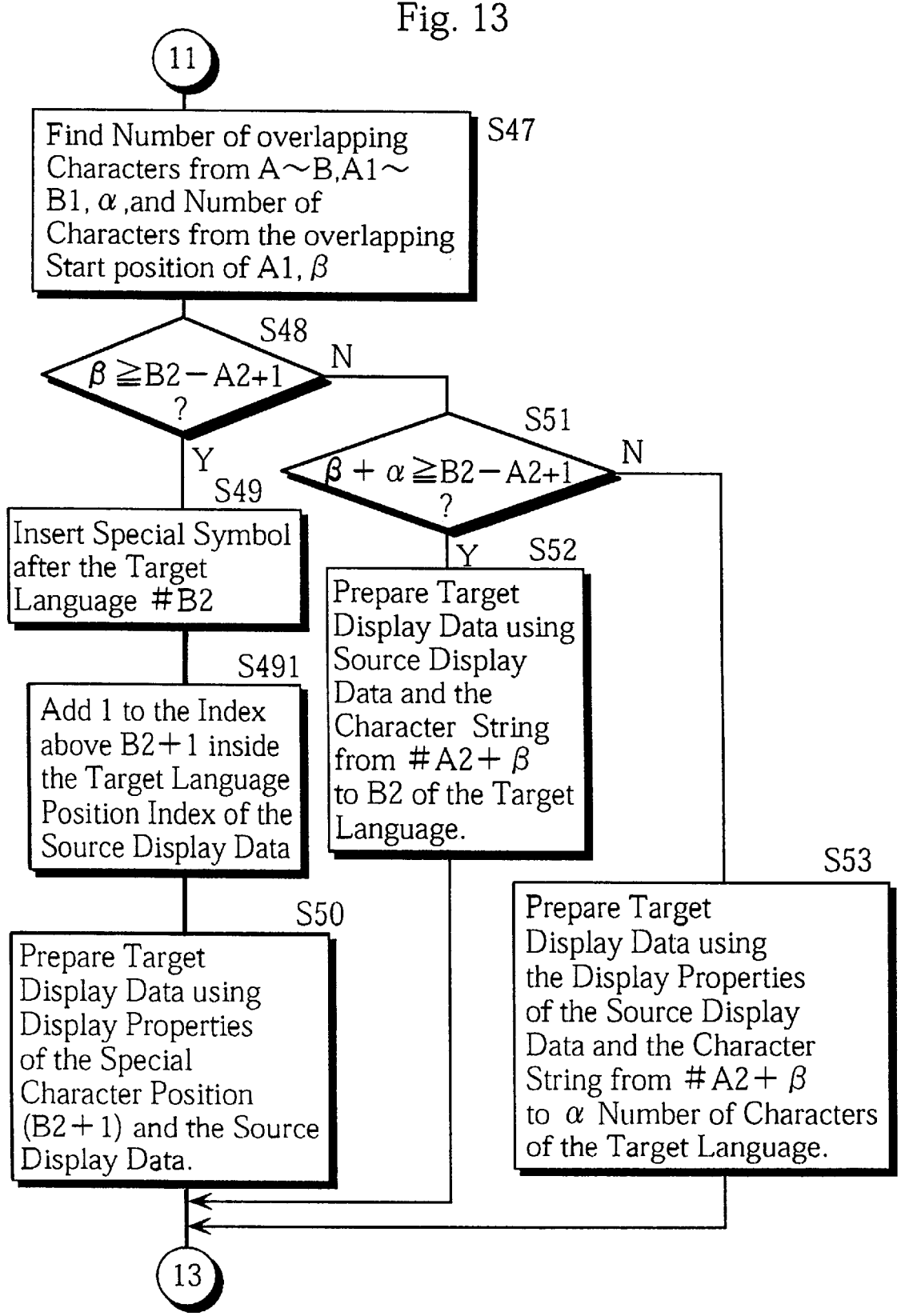
FIG. 13 is a flowchart showing target display date preparation processes 1 and 2.
Figure 14:
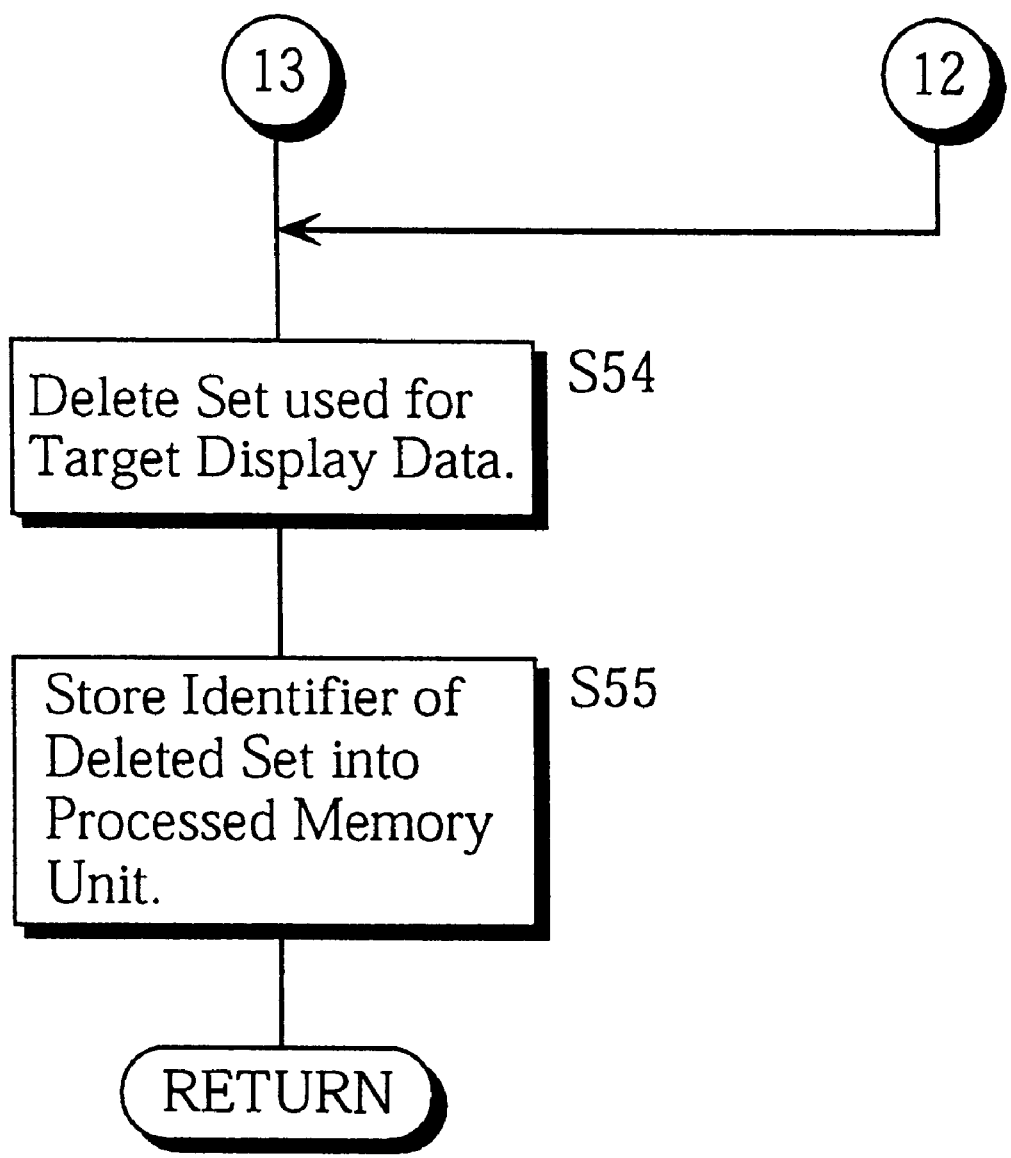
FIG. 14 is a flowchart showing target display data preparation processes 1 and 2.
Figure 15:
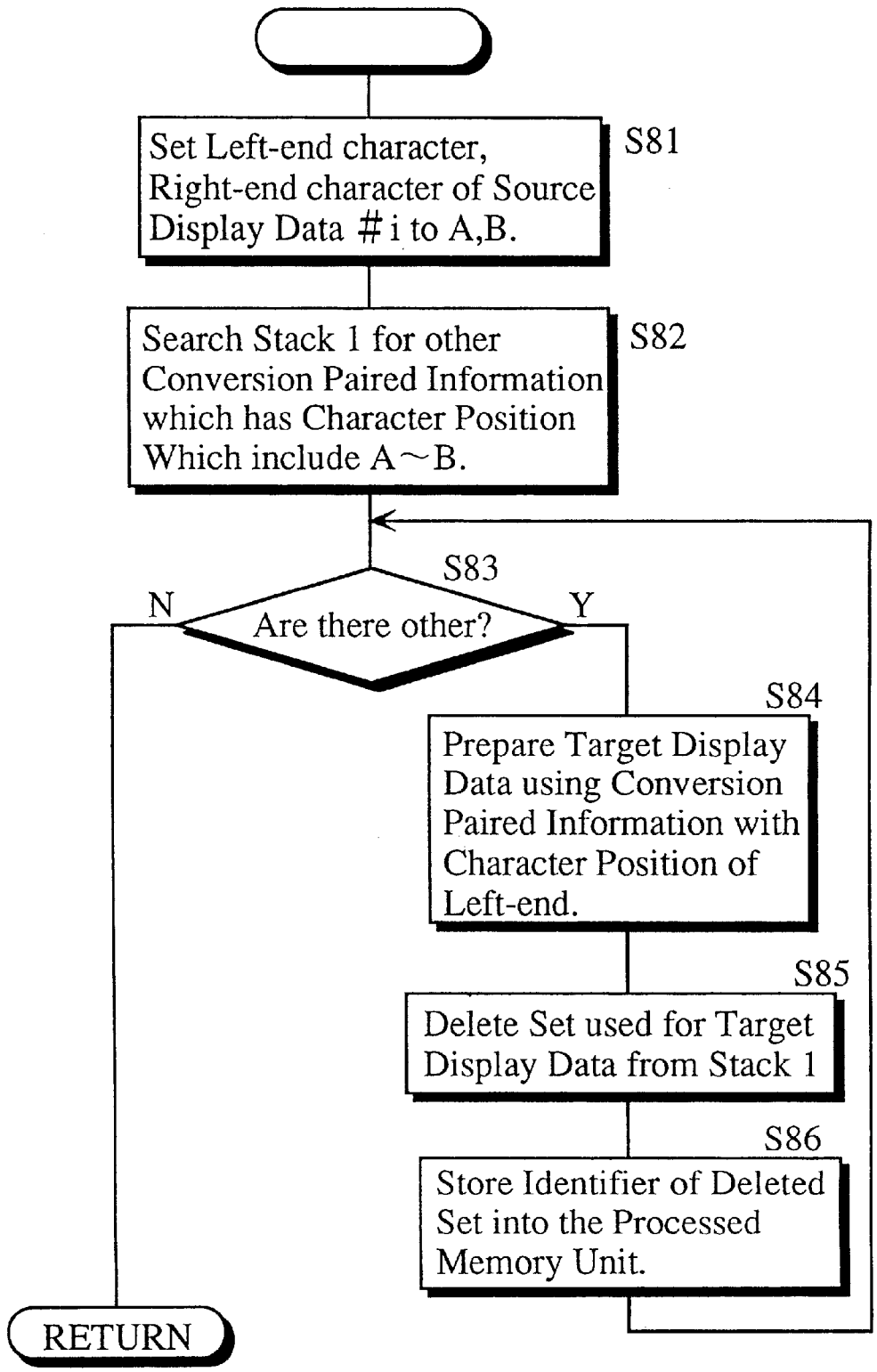
FIG. 15 is a flowchart showing target display data preparation process 3.

The following is an explanation based on FIGS. 12, 14 and 15 of the processes for preparation of the target display data when a bet made up of the first of the source display data and one of the conversion paired information is determined to be stored in stack 3. First the left-end letter location and right-end letter location of the source language in the conversion paired information which is a set with the source display data are set in the register of A1, B1, while the left-end letter location and the right-end letter location of the target language are set in the register of A2, B2 respectively (step 43). Then stacks 2 and 3 are searched to see if there are any other specific source display data. The specific source data mentioned here is data which, together with the conversion paired information which has the letter positions of A1~B1 in common, is a set. If, as a result of the search, it is determined that there are no others (step 45), the left-end letter and right-end latter locations of the first of the source display data are set to register A, B (step 46), and the number of overlapping letters α from A~B, A1~B1, and the number of letters β from the overlapping start location of A1 are found (step 47). Next, β is compared to the number of letters (B2−A2+1) in the word of the target language (step 48). This judgement is to deal with the situation when number or letters from the beginning of the word in the source language to the letter with the display property attached are of more numerous than the number of letters of the corresponding word in the target language. In other words, in this situation a special symbol which shows the display properties is inserted at the end of the corresponding word (after the word in location B2) in the target language (step 49). Next, the procees which increases the letter location by one in step 491 is performed on target display data and conversion paired information which requires rewriting of the letter locations because of the insertion of the special symbol. Then, target display data is prepared using the special symbol insertion location (B2+1) and the display properties of the source display data (step 50). For example, the "p" inserted at the end of in the displayed text of the target language of text string #4 in FIG. 7 is an example of such a special symbol. In this example, the "n" of the "pen" in the source language is a pointer which shows the link destination tile, so a "P" is used to show that it is a pointer in the target language side. Also, preparation of the target display data makes use of the letter location of this "P".

On the other hand, if the number of letters in the word of the target language (B2−A2+1) are determined to be greater than the value of β, the number of letters in the word (B2-A2+1) are further determined whether they exceed the value of β+α (step 51). Through this determination, it becomes clear whether the number of letters in the word in the target language are greater or less than the number of letters from the beginning of the word to the last letter with the display properties attached in the source language. If the number of letters of the word in the target language is determined to be less, the area of the target language with display properties attached is set as the final end of the word in the target language (step 52). However, if the number of letters of the word in the target language is determined to be greater, then the area of the target language with display properties attached is sot to the same area (β~α+β) (step 53).

When the preparation of the target display data is finished in the above manner, the corresponding set in stack 3 is deleted (step 54), and the deleted set identifiers are saved in the processed memory unit (step 55). The deletion of the sets from the stacks in step 54 is to prevent the same set from being read from the stack a second time. Also, the storing of the used set identifier into the processed memory unit in step 55 is for the recording of the fact that the set was stored in one of the stacks, and for distinguishing between the source display data which has yet to be stored in any stack.

Furthermore, in the case when a plurality of source display data is determined to be present in stacks 2 and 3 in step 45, all sets present are loaded (step 56) and the target display data corresponding to the loaded sets is prepared (step 57). This preparation processing is the same as step 35 when the set is stored in stack 2, and the same as the process in steps 46–55 when the set is stored in stack 3, Step 35 is explained later, so a detailed explanation here will be avoided. The step 57 is repeatedly performed on the read-out set, When there are no unprocessed sets remaining (step 58), the sets used for the preparation of target display data in step 57 are deleted from the corresponding stacks (step 54), and the identifiers of the source display data in the deleted sets are stored in the processed memory unit (step 55). The process then returns to the main flowchart. Here, it should be noted that the set used to prepare the target display data in the chain of processes in steps 56, 57, and 58 covers the letters numbered A1~B1 in the text body of the source language, is covered by A1~B1, is the set of the source display data which overlaps A1~B1 and the conversion paired information which sets A1B1to the source language letter location, and is not the entire display data #i. This is because even if this is the source display data #i, there are sets with conversion paired information with source language letter locations outside A1~B1. An example of this is when the overlap of the area in which the word and the display properties of the source language is only a part, as in pattern 2. The attached part of the display properties excluded from the overlap is often overlapping a part or all of the previous or next word.

If the process of step 35 ends in the above manner, the set included in the conversion paired information is determined whether or not it is stored in stack 2 or stack 1 (step 31), and if still not stored, the process is carried out. For example, if the corresponding set is determined to be stored in stack 2 (step 33), target display data preparation process 2 is carried out. This process 2 is executed through the same subroutine as described above. However, regarding the source display data #1, the search and deletion or the sets stored through process 1 in not only stack 3 but also stack 2 is completes so when process 2 is executed, only a few sets including source display data #1 remain in stack 2. The set which is for the word registered in A1, B1 register in process 1 probably does not remain, so the set which is for the next word (the set which probably belongs to pattern 2) is the only set remaining. However, the set which is for the next word and includes the source display data #2 onwards is assumed to belong to pattern 2 or pattern 3. Consequently process 2 becomes the preparation for target display data for this kind of set. Because the target display data preparation process 2 is executed by the same subroutine as process 1, however, a more detailed explanation will be avoided here.

When the above processes are finished, it is determined whether there are sets which include the source display data in stack 1 (steps 21, 34). If there are, target display data preparation process 3 is executed (step 37). If it is determined that such a set is stored in stack 1, the subroutine in FIG. 15 is executed. In the case of the set stored in stack 1, the word in the source language and the character string with display properties attached are in relation to pattern 1 shown in FIG. 17, and the fact that the area with display properties attached is always larger than the number of letters of the word is different from the other patterns. Because of this, the target display data preparation process is carried out separately depending on whether the set is stored in stack 1, or in stacks 2 or 3.

In this situation the process sets the characters string's left-end location and right-end location which include source display data #1 to the A and B register (step 81), and searches to see whether other conversion paired information having the letter location (A1–B1) which includes letter locations A~B (step 82). That is, the process searches to see whether or not the there are any other sets of pattern 1 which share letter location A~B. If, as a result of the search, it is determined that there are others (step 83), then the conversion paired information with the left-end letter location (source language) is selected from among all the discovered sets, and target display data is prepared (step 84). In this case the letter location of the target display data uses the letter location of the target language or the conversion paired information as is, and uses the source display data as is. When the preparation of the target display data is finished, the used set is deleted from stack 1 (step 85), and the identifier of the source display data within the deleted set is stored in the processed memory unit (step 86). Then, the search of step 82 is once again carried out, and the target display data is prepared using the conversion paired information with the left-end letter location from the discovered set (step 84). This process is carried out until the last set is discovered from stack 1.

In the above manner the process of step 37 is finished, and once again each stack is searched to see whether there is unprocessed data of the first source display data in step 31. If there is none, then i is increased by one and the process of the first source display data is carried out for the second source display data, and second display data is prepared.

Figure 16:
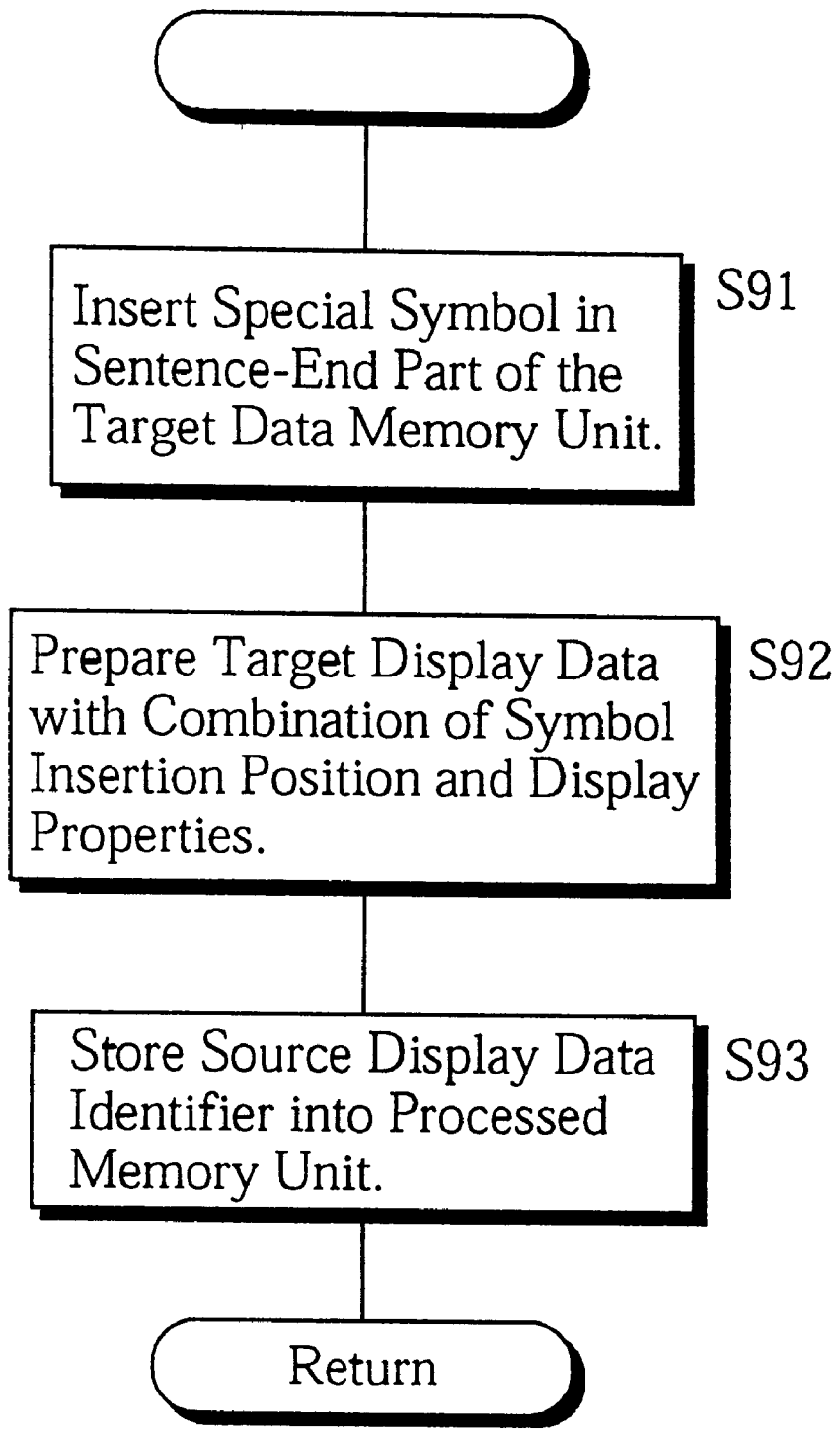
FIG. 16 is a flowchart which shows the special symbol insertion process.

If, for example, the set of the second source display data and the conversion paired information are not detected from any of the stacks 1–3, and the identifiers are not present in the processed memory unit, the process proceeds to step 38, and carries out the insertion of special symbols. That is, if it is the case that there is source display data without the set which include the second source display data in stacks 1–3, and also the processed set identifiers pertaining to the second source display data are not stored in the processed memory unit, then this means that it is a word with no proper translation in the target language, such as the indefinite article "a". As a consequence, when such a word has display properties attached the process proceeds to step 38, and carries out the insertion of special symbols into the text body of the target text, and informs the user that an untranslated word has display properties attached. As shown in FIG. 16, the special symbol insertion process inserts the special symbol into the part corresponding to the end of the sentence in the target display data (step 91), prepares the target display data with the combination of the insertion location and the display properties which include the source display data (step 92). Then, the second source display data is stored in the processed memory unit (step 93). The identifier is stored in order to enable confirmation of whether the special symbol insertion process is complete when the process proceeds to step 31. If the special symbol insertion process had been determined to be completed, then the entire process of preparing the target display data using the source display data is deemed finished, and i is incremented by one while the process for preparing the source display data begins.

When preparation of the target display data for all the source display data is finished in the above manner (step 39), the process returns to the main flowchart. Thus, the preparation process of the target display data for an entire document is finished.

The target display data given in FIG. 7 are examples created in the above flowchart using the same string or source display data and conversion paired information.

Furthermore, in the case where there is an underline beneath "never" such as in the source text body of characters string #5, the source display data is (2-6, UL), while the conversion paired information is (2-6, 2-4) and (2-6, 7-5), so there are two shared locations included in the source letter location. Therefore, with the configuration of the above embodiment, two target display data are prepared, and as a result, a process in which the two character strings of and are underlined in the target text. When this happens, it is somewhat unnatural that an underline in one place in the source text corresponds to two places in the target text. Because of this, the output of one of the two generated target display data is stopped, and the other is written in the target display data memory unit 8. For example only the target display data closest to the end of the sentence is selected and written in the memory unit 8. The target language text in string #5 of FIG. 7 is an example of when only one target display data is selected.

In the above embodiment the source text is English and the target text is Japanese, but this invention is not limited to the above languages. Furthermore it is not necessary that the source text and the target text are different languages, for this invention may be applied in the conversion of a document from one dialect into another dialect of the same language.

What is claimed is:

1. A document conversion apparatus for converting source data into target data comprising:

source text memory means for storing a source text;

source display data memory means for storing a source display data, wherein the source display data is a combination of source display properties included in the source text and a location in which source display properties are attached to the source text;

conversion means for converting a source text body into a target text body, the source text body being text in which source display properties are excluded, the target text also being text in which display properties are excluded;

target text memory means for storing the converted target text body;

conversion paired information memory means for storing conversion paired information, wherein the conversion paired information is a combination showing how the words in the source text correspond to the words in target text, wherein word is defined as a unit with meaning;

process means for processing the target text body and preparing a target display data by searching the source display data and the conversion paired information, wherein the target display data is data showing target display properties to be attached and a location in the target text body to which should be attached target display properties corresponding to the source display properties;

target text preparation means for preparing a target text by attaching the display properties to the target text body stored in the target text memory means, the attaching carried out by conforming to the contents of the target display data obtained from the process means; and display means for displaying the prepared target texts.

2. The document conversion apparatus of claim 1, wherein the source display properties and target display properties include character decoration and pointers to link destination files.

3. The document conversion apparatus of claim 2, wherein the source text and the target text are both HTML documents, and the contents and the area of the source and target display properties are indicated by tag symbols.

4. The document conversion apparatus of claim 2, wherein the process means comprise:

display property attachment area search unit for checking the location of the source display properties and the word shown by the information of the source text of the conversion paired information, and searching in one-letter units to see whether the display properties are attached to any of the letters inside the source text;

distinction unit for distinguishing whether source display properties are attached to a part of the word, or display properties are attached to the entire word according to the search result; and main preparation processing unit for checking the information of the target text in the conversion paired information, and using the distinction result to process the target text body and prepare the target display data.

5. The document conversion apparatus of claim 4, wherein the main preparation processing unit comprises:

conversion word presence detection unit for searching the conversion paired information to see whether the word corresponding to the word in the source text is present in the target text;

first preparation processing unit for carrying out the process of inserting special symbols to the target text body stored in the target text memory means while preparing the target display data for the special symbols when the conversion word presence detection unit determines that there is no corresponding word in the target text; and second preparation processing unit for preparing the target display data for the letter within the word when the conversion word presence detection unit determines that there is a corresponding word in the target text.

6. The document conversion apparatus of claim 5, wherein the special symbol attachment process carried out by the first preparation processing unit may be a process which uses letters which do not belong to a target language as special symbols to be inserted in the start or end locations or the target text body.

7. The document conversion apparatus of claim 6, wherein the second preparation process unit comprises:

first processing unit for operating when the distinction unit determines that the display properties are attached to the entire word; and second processing unit for operating when the distinction unit determines that the display properties are attached to a part of the word.

8. The document conversion apparatus of claim 7, wherein the first processing unit detects the word in the target text which corresponds to the word in the source text based on the conversion paired information, and prepares the target display data which contains target display properties of the entire word, and wherein the second preparation processing unit prepares the target display data which contains target display properties of a part of the corresponding word in the target text.

9. The document conversion apparatus of claim 8, wherein the second preparation processing unit comprises:

letter number detection element for detecting the number of letters from the start of the word in the source text to the letter with display properties attached; and process element for preparing the target display data which contains the display properties from the start of the corresponding word in the target text to the location away from the same number of letters as the number of letters previously detected.

10. The document conversion apparatus of claim 9, wherein the process element comprises:

comparison element for comparing the number of letters of the word in the target text to the detected number of letters of the letter number detection element;

first element for operating when, as a result of comparison, the number of letters in the word of the target text is the same or greater than the number of detected letters; and second element for operating when the number of letters in the word of the target text is less than the number of detected letters.

11. The document conversion apparatus of claim 10, wherein the first element prepares the target display data which includes display properties attached to letters in a word of the target text, the letters excluding a detected number of letters starting from the first letter of the word.

12. The document conversion apparatus of claim 11, wherein the second element carries out the process of inserting a special symbol after the corresponding word in the target text which is stored in the target text memory means, and prepares the target display data for the special symbol.

13. The document conversion apparatus of claim 12, wherein the source text and the target text are both HTML documents, and the contents and the area of the source and target display properties are indicated by tag symbols.

14. The document conversion apparatus of claim 2, wherein the process unit further comprises:
   conversion paired information overlap search unit for searching to see if there are more than two sets of conversion pair information for the same word in the source text;
   selection unit for selecting the target display data prepared by using one set of the conversion paired information when there are more than two sets; and
   target text preparation means for carrying out text preparation using the target display data selected by the selection unit.

15. The document conversion apparatus of claim 14, wherein the target display data to be selected by the selection unit is for the word in the target text closer to the sentence start, or for the word closer to the sentence end.

16. The document conversion apparatus of claim 15 wherein the process means comprises:
   display property attachment area search unit for checking the location of the source display properties and the word shown by the information of the source text of the conversion paired information, and searching in one-letter units to see whether the display properties are attached to any of the letters inside the source text;
   distinction unit for distinguishing whether source display properties are attached to a part of the word, or display properties are attached to the entire word according to the search result; and
   main preparation processing unit for checking the information of the target text in the conversion paired information, and using the distinction result to process the target text body and prepare the target display data.

17. The document conversion apparatus of claim 16, wherein the main preparation processing unit comprises;
   conversion word presence detection unit for searching the conversion paired information to see whether the word corresponding to the word in the source text is present in the target text;
   first preparation processing unit for carrying out the process of inserting special symbols to the target text body stored in the target text memory means while preparing the target display data for the special symbols when the conversion word presence detection unit determines that there is no corresponding word in the target text; and
   second preparation processing unit for preparing the target display data for the letter within the word when the conversion word presence detection unit determines that there is a corresponding word in the target text.

18. The document conversion apparatus of claim 17, wherein the special symbol attachment process carried out by the first preparation processing unit may be a process which uses letters which do not belong to a target language as special symbols to be inserted in the start or end locations of the target text body.

19. The document conversion apparatus of claim 18, wherein the second preparation process unit comprises:
   first processing unit for operating when the distinction unit determines that the display properties are attached to the entire word; and
   second processing unit for operating when the distinction unit determines that the display properties are attached to a part of the word.

20. The document conversion apparatus of claim 19, wherein the first processing unit detects the word in the target text which corresponds to the word in the source text based on the conversion paired information, and prepares the target display data which contains target display properties of the entire word, and
   wherein the second preparation processing unit prepares the target display data which contains target display properties of a part of the corresponding word in the target text.

21. The document conversion apparatus of claim 20 wherein the second preparation processing unit comprises:
   letter number detection element for detecting the number of letters from the start of the word in the source text to the letter with display properties attached; and
   process element for preparing the target display data which contains the display properties from the start of the corresponding word in the target text to the location away from the same number of letters as the number of letters previously detected.

22. The document conversion apparatus of claim 21, wherein the process element comprises:
   comparison element for comparing the number of letters of the word in the target text to the detected number of letters of the letter number detection element;
   first element for operating when, as a result of comparison, the number of letters in the word of the target text is the same or greater than the number of detected letters; and
   second element for operating when the number of letters in the word of the target text is less than the number of detected letters.

23. The document conversion apparatus of claim 22, wherein the first element prepares the target display data containing the display properties to be attached to the letters from the start of the corresponding word in the target text to the end of the detected word.

24. The document conversion apparatus of claim 23, wherein the second element carries out the process of inserting a special symbol after the corresponding word in the target text which is stored in the target text memory means, and prepares the target display data for the special symbol.

25. A document conversion apparatus comprising:
   source text acquisition means for acquiring and storing source text written in HTML received from outside;
   source display data preparation means for preparing and storing a source display data by reading a source text and finding contents of display properties and locations to which the display properties are attached by searching the tag marks attached to the source text,
   wherein the source display data is a pair made up of data showing the contents of the display properties and the location to which display properties are attached;

conversion means for converting a source text body into a target text body, the source text body being text in which source display properties are excluded, the target text also being text in which display properties are excluded;

target text memory means for storing the converted target text body;

conversion paired information memory means for storing conversion paired information, wherein the conversion paired information is a combination showing how the words in the source text correspond to the words in target text, wherein word is defined as a unit with meaning;

process means for processing the target text body and preparing a target display data by searching the source display data and the conversion paired information, wherein the target display data is data showing target display properties to be attached and a location in the target text body to which should be attached target display properties corresponding to the source display properties;

target text preparation means for preparing the text through inserting tag symbols into the target text stored in the target text memory means by conforming to the target display data; and display means for displaying the prepared target text.

26. The document conversion apparatus of claim 25, wherein the source display properties and target display properties include character decoration and pointers to link destination files.

27. The document conversion apparatus or claim 26, wherein the process means comprise:

display property attachment area search unit for checking the location of the source display properties and the word shown by the information of the source text of the conversion paired information, and searching in one-letter units to see whether the display properties are attached to any of the letters inside the source text;

distinction unit for distinguishing whether source display properties are attached to a part of the word, or display properties are attached to the entire word according to the search result; and main preparation processing unit for checking the information of the target text in the conversion paired information, and using the distinction result to process the target text body and prepare the target display data.

28. The document conversion apparatus of claim 27, wherein the main preparation processing unit comprises:

conversion word presence detection unit for searching the conversion paired information to see whether the word corresponding to the word in the source text is present in the target text;

first preparation processing unit for carrying out the process of inserting special symbols to the target text body stored in the target text memory means while preparing the target display data for the special symbols when the conversion word presence detection unit determines that there is no corresponding word in the target text; and second preparation processing unit for preparing the target display data for the letter within the word when the conversion word presence detection unit determines that there is a corresponding word in the target text.

29. The document conversion apparatus of claim 28, wherein the special symbol attachment process carried out by the first preparation processing unit may be a process which uses letters which do not belong to a target language as special symbols to be inserted in the start or end locations of the target text body.

30. The document conversion apparatus of claim 29, wherein the second preparation process unit comprises:

first processing unit for operating when the distinction unit determines that the display properties are attached to the entire word; and second processing unit for operating when the distinction unit determines that the display properties are attached to a part of the word.

31. The document conversion apparatus of claim 30, wherein the first processing unit detects the word in the target text which corresponds to the word in the source text based on the conversion paired information, and prepares the target display data which contains target display properties of the entire word, and wherein the second preparation processing unit prepares the target display data which contains target display properties of a part of the corresponding word in the target text.

32. The document conversion apparatus of claim 31, wherein the second preparation processing unit comprises:

letter number detection element for detecting the number of letters from the start of the word in the source text to the letter with display properties attached; and process element for preparing the target display data which contains the display properties from the start of the corresponding word in the target text to the location away from the same number of letters as the number of letters previously detected.

33. The document conversion apparatus of claim 32, wherein the process element comprises:

comparison element for comparing the number of letters of the word in the target text to the detected number of letters of the letter number detection element;

first element for operating when, as a result of comparison, the number of letters in the word of the target text is the same or greater than the number of detected letters; and second element for operating when the number of letters in the word of the target text is less than the number of detected letters.

* * * * *